(12) United States Patent
Alongi et al.

(10) Patent No.: US 11,728,504 B2
(45) Date of Patent: Aug. 15, 2023

(54) METHOD AND DEVICE FOR ASSEMBLING ELECTRODES

(71) Applicant: MANZ ITALY S.R.L., Sasso Marconi (IT)

(72) Inventors: Pasqualino Alongi, Modena (IT); Massimiliano Sale, Sasso Marconi (IT)

(73) Assignee: MANZ ITALY S.R.L., Sasso Marconi (IT)

( * ) Notice: Subject to any disclaimer, the term of this patent is extended or adjusted under 35 U.S.C. 154(b) by 427 days.

(21) Appl. No.: 16/762,768

(22) PCT Filed: Nov. 6, 2018

(86) PCT No.: PCT/IB2018/058689
§ 371 (c)(1),
(2) Date: May 8, 2020

(87) PCT Pub. No.: WO2019/092585
PCT Pub. Date: May 16, 2019

(65) Prior Publication Data
US 2020/0365930 A1    Nov. 19, 2020

(30) Foreign Application Priority Data
Nov. 13, 2017  (IT) .................. 102017000128971

(51) Int. Cl.
*H01M 10/04* (2006.01)
*B65H 35/08* (2006.01)
*B32B 38/04* (2006.01)
*H01M 50/406* (2021.01)
*B32B 38/00* (2006.01)

(52) U.S. Cl.
CPC ........ *H01M 10/0404* (2013.01); *B65H 35/08* (2013.01); *H01M 50/406* (2021.01); *B32B 38/0004* (2013.01)

(58) Field of Classification Search
CPC ............ H01M 10/0404; H01M 50/403; B65H 35/08; B32B 38/0004; Y02P 70/50
See application file for complete search history.

(56) References Cited

U.S. PATENT DOCUMENTS

| | | | |
|---|---|---|---|
| 6,024,683 A * | 2/2000 | Wilkes | B65H 35/08 493/210 |
| 6,585,846 B1 | 7/2003 | Hanson et al. | |
| 2015/0033547 A1 | 2/2015 | Yang et al. | |

FOREIGN PATENT DOCUMENTS

| | | |
|---|---|---|
| JP | 20040515040 | 5/2004 |
| JP | 20090009919 | 1/2009 |

(Continued)

*Primary Examiner* — George R Koch
*Assistant Examiner* — Christopher C Caillouet
(74) *Attorney, Agent, or Firm* — Leason Ellis LLP

(57) ABSTRACT

In a method and apparatus for assembling electrodes, in order to produce electrical energy storage devices, in particular lithium batteries, the electrodes are placed one after the other at a mutual distance on a separator which advances along a feeding path, then the separator is cut by a pair of counter-rotating blades along a cutting line perpendicular to the feeding direction of the separator, said cutting line being arranged in a separator portion without electrodes and comprised between two adjacent electrodes; the method and apparatus allow the assembly of electrodes of limited length with high productivity.

15 Claims, 7 Drawing Sheets

(56) References Cited

FOREIGN PATENT DOCUMENTS

| JP | 20110183461 | 9/2011 |
|----|-------------|--------|
| JP | 20170105083 | 6/2017 |
| WO | WO 00/72398 | 11/2000 |

\* cited by examiner

METHOD AND DEVICE FOR ASSEMBLING ELECTRODES

CROSS-REFERENCE TO RELATED PATENT APPLICATIONS

This application is a U.S. National Phase Application under 35 U.S.C. § 371 of International Patent Application No. PCT/IB2018/058689, filed Nov. 6, 2018, which claims the priority of Italian Patent Application No. 102017000128971, filed Nov. 13, 2017, all of which are incorporated by reference, as if expressly set forth in their respective entireties herein.

BACKGROUND OF THE INVENTION

The invention concerns a method and an apparatus for assembling electrodes, in particular for the production of electrochemical cells.

Specifically, but not exclusively, the invention can be applied to make electrical energy storage devices, for example lithium batteries.

The prior art includes patent publication US 2015/0033547 A1, which discloses a method for assembling electrodes in which a blade with linear motion cuts a separator with a series of cuts, transverse to the advancement of the separator, according to a step that depends on the length of the electrodes.

Patent publication U.S. Pat. No. 6,585,846 B1 discloses a method according to the preamble of claim 1.

One of the limits of the prior art is a low productivity when it comes to assembling electrodes of relatively limited length. In this case, in fact, the step of the transversal cuts is short and the inertia of the moving masses does not allow working with high feed speeds of the separator.

Another drawback of the prior art is the risk of damaging the separator during the various assembly operations, since the separator is made of very thin, flexible and delicate sheet material, which can advance only if pulled, but which can easily tear off if pulled too much. A particularly delicate operation is the cutting of the separator which must be executed in a clear and precise manner, without causing damage or imperfections to the assembly structure, to obtain high quality electrochemical cells.

SUMMARY OF THE INVENTION

An object of the invention is to overcome one or more of the aforesaid limits and drawbacks of the prior art.

An object of the invention is to provide a method and/or apparatus for assembling electrodes which is suitable for the formation of electrochemical cells which can be used in the production of electrical energy storage devices.

An advantage is to allow the assembly of electrodes of relatively limited lengths with high productivity.

An advantage is to provide an apparatus and/or method for assembling electrodes with high productivity and continuous material processing.

An advantage is to allow the production of high quality electrical energy storage devices with high efficiency.

An advantage is to make available an electrode assembly apparatus that is constructively simple and economical.

These objects and advantages and others are achieved by a method and/or apparatus according to one or more of the claims set forth below.

In one example, an electrode assembly method comprises the steps of arranging electrodes one after the other at a mutual distance on at least one separator which advances (e.g., with continuous motion) along a feed path and then cutting the separator by a pair of counter-rotating blades along a cutting line which is transverse to a feed direction of the separator and which is arranged in a portion of separator that is electrode-free and comprised between two adjacent electrodes, allowing electrodes of limited length to be assembled with high productivity.

In one example, an electrode assembly apparatus comprises means for arranging electrodes one after the other at a mutual distance on at least one separator which advances (e.g., with continuous motion) along a feed path and at least one pair of counter-rotating blades arranged to cut the separator in a separator portion without electrodes and between two adjacent electrodes.

BRIEF DESCRIPTION OF THE DRAWINGS

The invention can be better understood and implemented with reference to the attached drawings which illustrate non-limiting examples of embodiment thereof, in which.

DETAILED DESCRIPTION

Making reference to the aforesaid figures, similar elements of different embodiments have been indicated, for simplicity, with the same numbering.

With 1 an apparatus for assembling electrodes has been indicated as a whole. The assembly apparatus 1 may be used, in particular, for the formation of electrochemical cells which can be used to produce electrical energy storage devices, for example lithium batteries.

The assembly apparatus 1 may comprise, in particular, at least one separator feeder 2 configured to feed at least one separator S in a feed direction F, with continuous or intermittent motion, along a feed path. The separator S may comprise, as in these examples, continuous material sheet or tape. The separator feeder 2 may comprise, in particular, at least one coil 3 where the separator S in the form of a continuous element is wound and/or means for unwinding the separator S from the coil 3 and for moving the separator S in a guided manner along the feed path.

It is possible to provide, for example, tape guiding and tensioning means (for example of the roller type) and/or one or more tape dragging means (for example of the roller type) and/or other tape handling means (for example of a known type).

Figure 1:
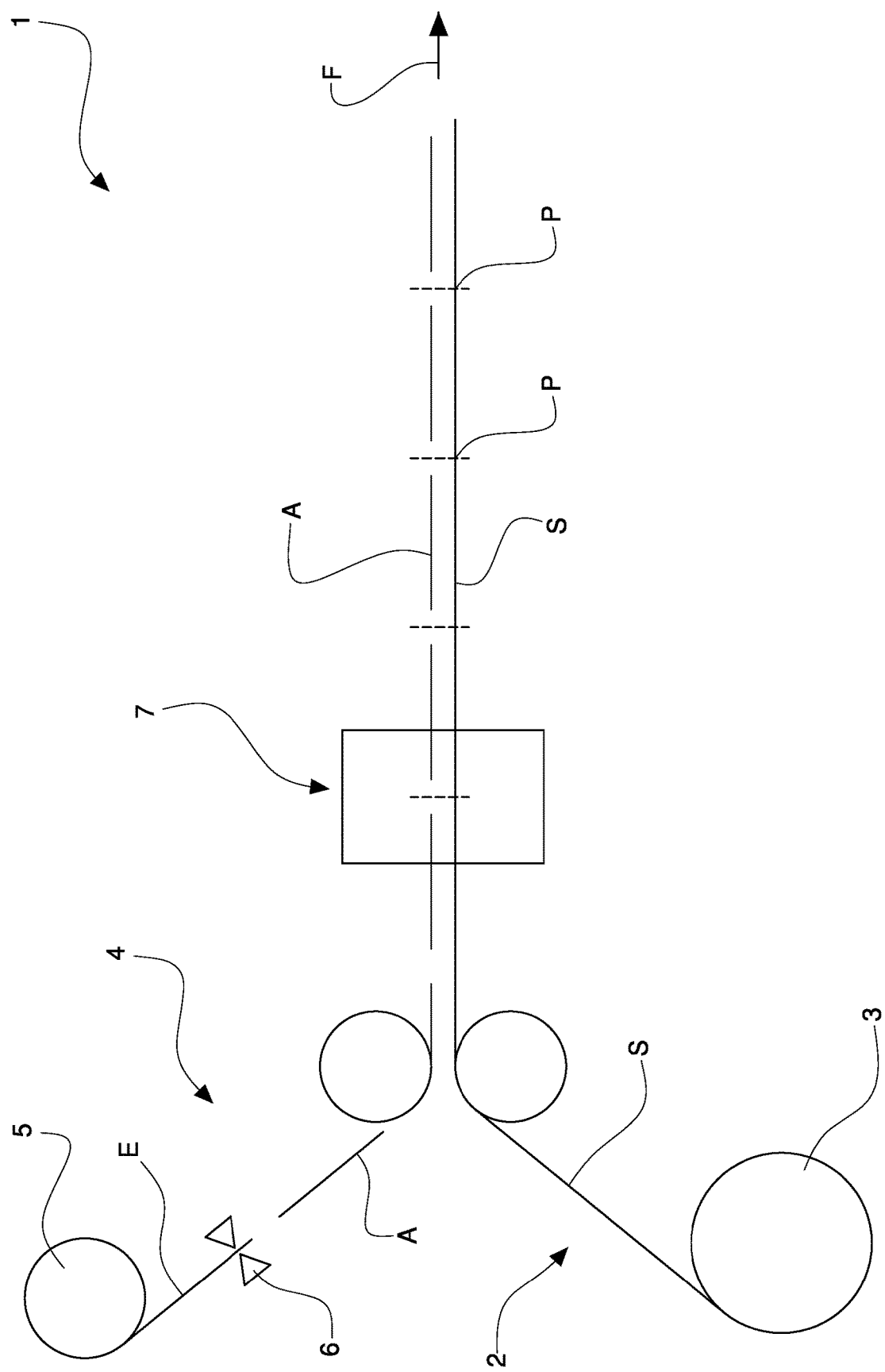
FIG. 1 is a diagram of a first example of an assembly apparatus made in accordance with the present invention.
Figure 2:
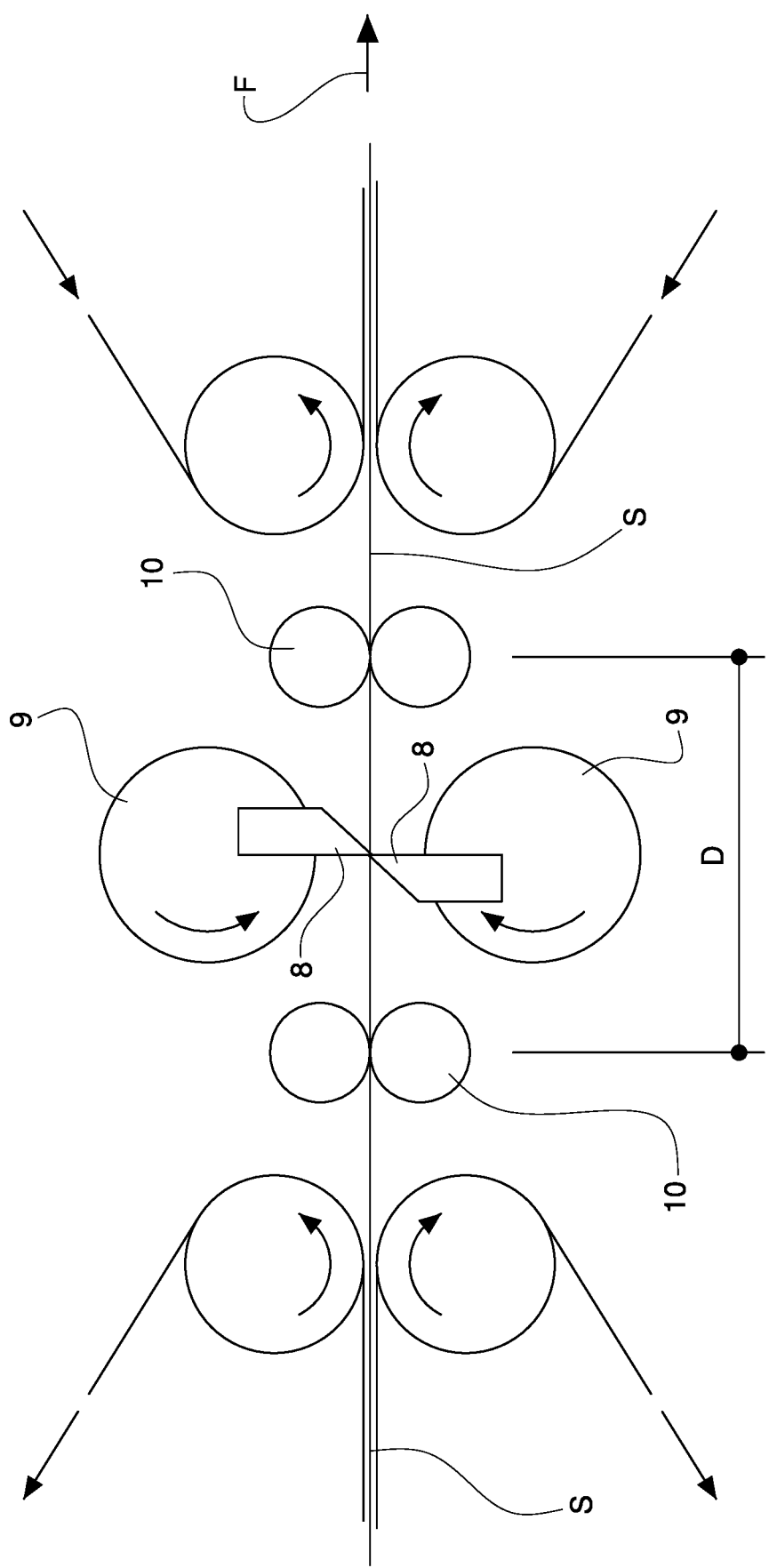
FIG. 2 is a diagram of the cutting device used in the assembly apparatus of FIG. 1.
Figure 6:
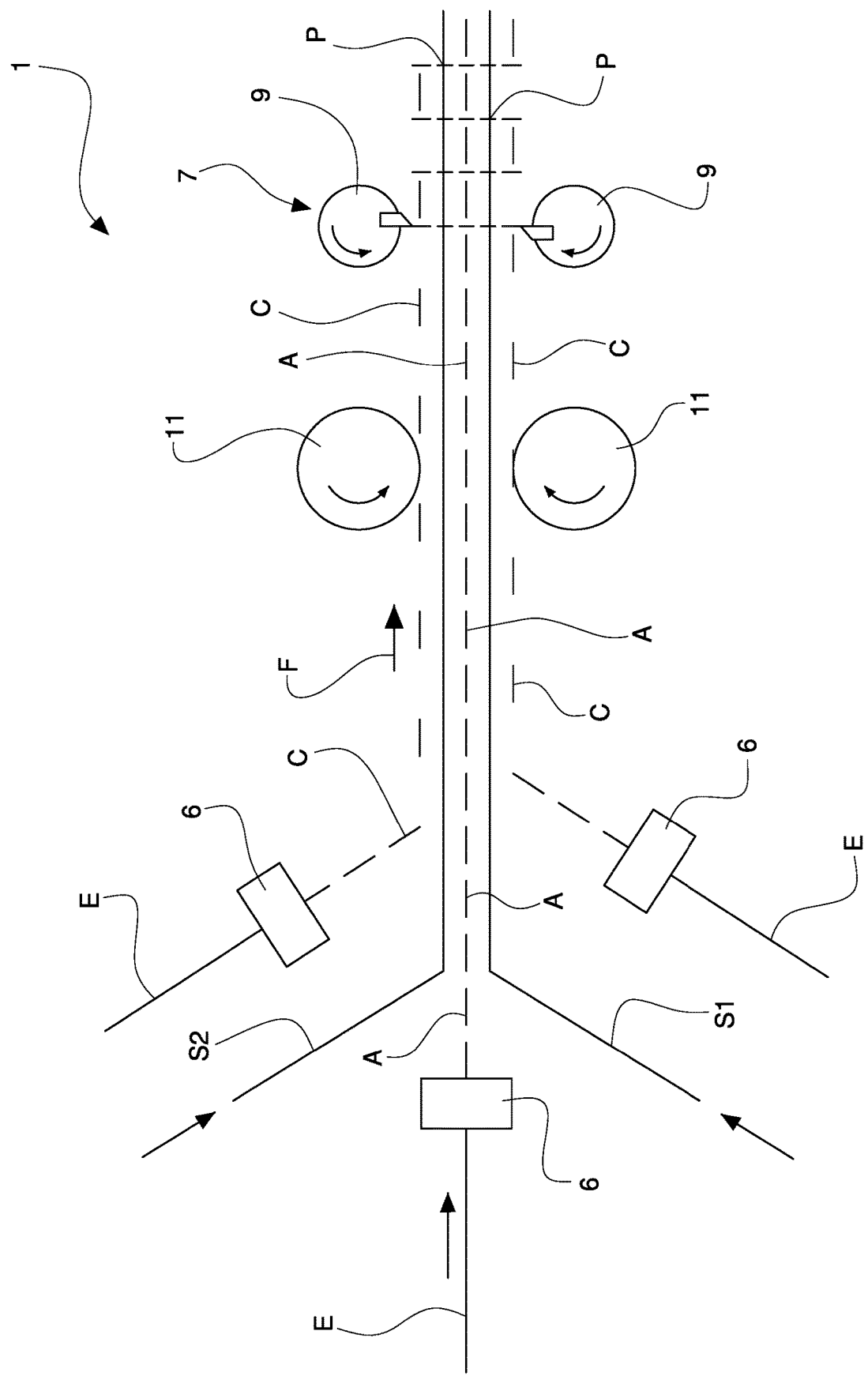
FIG. 6 is a diagram of a second example of an assembly apparatus made in accordance with the present invention.

FIG. 1 shows an assembly apparatus 1 suitable for assembling electrodes on a single separator S. FIG. 6 shows an assembly apparatus 1 suitable for assembling electrodes on two distinct separators S1 and S2.

The assembly apparatus 1 may comprise, in particular, at least one electrode feeder 4 configured for arranging a plurality of electrodes (anodes A and/or cathodes C) in succession, one after the other, at a mutual distance from each other, on at least one side of the separator S, S1 or S2 along the feed path. The electrode feeder 4 may comprise, in particular, at least one coil 5 where at least one electrode E in the form of a continuous element is wound.

The electrode feeder 4 may comprise, as in these examples, at least one forming device configured to form a plurality of discrete electrodes from an electrode E in the form of a continuous sheet. The forming device may comprise, in particular, a cutting device 6 suitable for cutting electrodes (for example an electrode cutting device of known type) arranged to separate discrete electrodes from the continuous electrode E while the latter is unwound from the coil 5. The discrete electrodes are then fed towards the feed path of the separator where they are arranged in an ordered manner on the separator itself.

The assembly apparatus 1 may comprise, in particular, at least one cutting device 7 suitable for cutting a separator arranged along the feeding path after the electrode feeder 4 to cut the separator along a transverse cutting line (perpendicular) to the feed direction F of the separator. The cutting device 7 may comprise, in particular, at least one pair of counter-rotating blades 8, i.e. two rotating blades 8 which interact together on the material (separator(s)) to be cut cooperating with each other for the cutting action. The two blades 8 may rotate, as in this case, around respective axes of rotation parallel to one another. The two blades 8 may be counter-rotating, that is, with opposite rotation directions. The axes of rotation of the two blades 8 may be, as in these examples, fixed.

The cutting device 7 may serve, in particular, for separating discrete elements (for example single electrochemical cells) from an assembly comprising at least one continuous separator and a plurality of discrete electrodes.

The cutting device 7 of the separator(s) may comprise, in particular (see FIG. 7), two opposed rollers 9, with axes parallel to each other and transversal (perpendicular) to the feed direction F of the separator, driven to rotate in a coordinated manner with opposite directions of rotation. The cutting device 7 of the separator(s) may comprise, in particular, a motor (not shown), for example an electric motor, for driving the two rollers 9. The rotation axes of the two rollers 9 may be connected to one another by a motion transmission mechanism (not shown), for example of the gear type, so that a rotor of the motor can simultaneously operate both rollers 9 in a coordinated manner with opposite rotations.

It is provided that the assembly comprising the separator(s) and the electrodes may pass between the two opposed rollers 9. Each roller 9 carries a respective blade 8 to cut the separator(s). Each blade 8 may be, as in these examples, embedded in a cavity of the respective roller 9. Each blade 8 may be fixed to the roller 9 by fixing means (not shown), for example of the screw type. The two rollers 9 may be arranged in such a way that the two cutting edges of the two counter-rotating blades 8 (one blade 8 for each roller 9) follow two respective circular paths.

Figure 7:
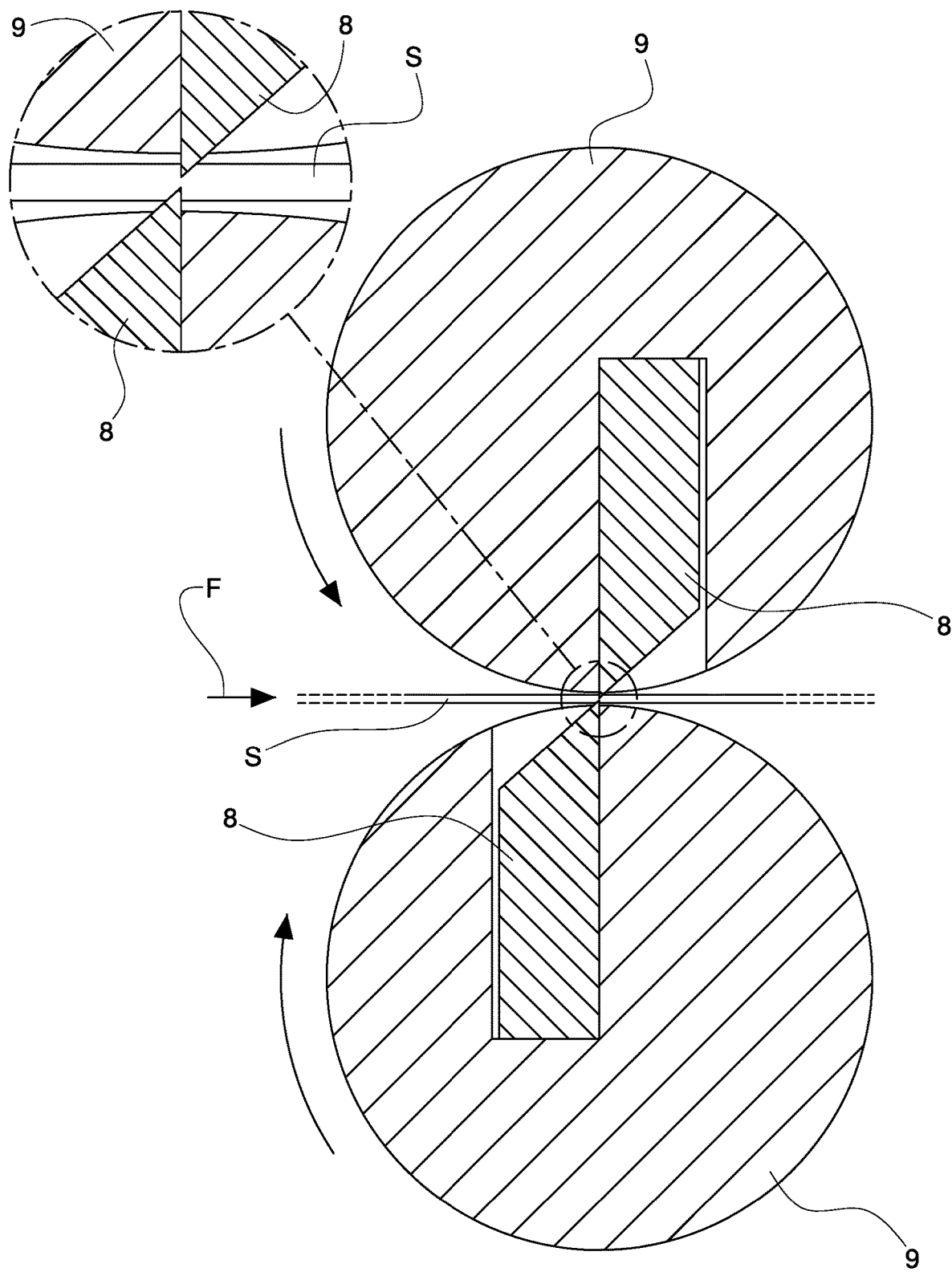
FIG. 7 is a section of a detail of a cutting device usable in an assembly apparatus according to the present invention.

The two (circular) paths of the two cutting edges may be configured such that the two cutting edges in their motion do not have mutual overlapping or interference along the cutting line, that is so that a cutting edge cuts the separator S on one side along the cutting line, and the other cutting edge cuts the separator S on the opposite side along the cutting line (FIG. 7). The mutual distance between the cutting edges at the cutting line may be equal to or greater than zero, this distance being considered in a direction normal to the feed direction F of the material, or in a direction normal to a plane of lying of the material M, or in a direction parallel to the plane that joins the two rotation axes of the rollers 9.

In particular, the two (circular) paths of the two cutting edges may be configured such that the two cutting edges in their motion are able to assume at least one cutting configuration (FIG. 7) in which both edges interfere with the material along the cutting line (a cutting edge incises one side of the separator S penetrating a thick portion and the other cutting edge incises the opposite side penetrating another thick portion) and is facing each other presenting a minimum reciprocal distance which is not null (so as not to penetrate the entire thickness of the separator S), for example greater than 1 μm (micrometer), or greater than 2 μm, or greater than 3 μm, or greater than 4 μm. In particular, the two cutting edges in the cutting configuration may interfere both with the material and may have a minimum reciprocal distance which is less than 10 μm, or less than 9 μm, or less than 8 μm, or less than 7 μm. It has been seen that the cutting of the material (separator S) takes place in a precise and clear manner even if the cutting edges, when they interfere with the material, do not interfere with each other, but are kept at a certain distance from one another, without affect the entire thickness of the material and without having mutual overlap. It is however possible to provide that the two cutting edges may assume a cutting configuration in which they have a zero mutual distance (in this case the circular paths of the two cutting edges form two cylinders tangential to each other along the cutting line), or a predetermined overlapping or mutual interference (relatively small, for example less than 10 μm, or less than 5 μm) along the cutting line of the material (in this case the circular paths of the two cutting edges form two cylinders partially interpenetrating the one in the other along the cutting line).

The assembly apparatus 1 may comprise, in particular, two pairs of driving rollers 10 arranged one upstream and the other downstream of the cutting device 7 for pulling the separator(s) and electrodes along the feed path. Each pair of driving rollers 10 may be provided with its own motorization, or a single motorization may be provided which drives both pairs of driving rollers 10.

Figure 3:
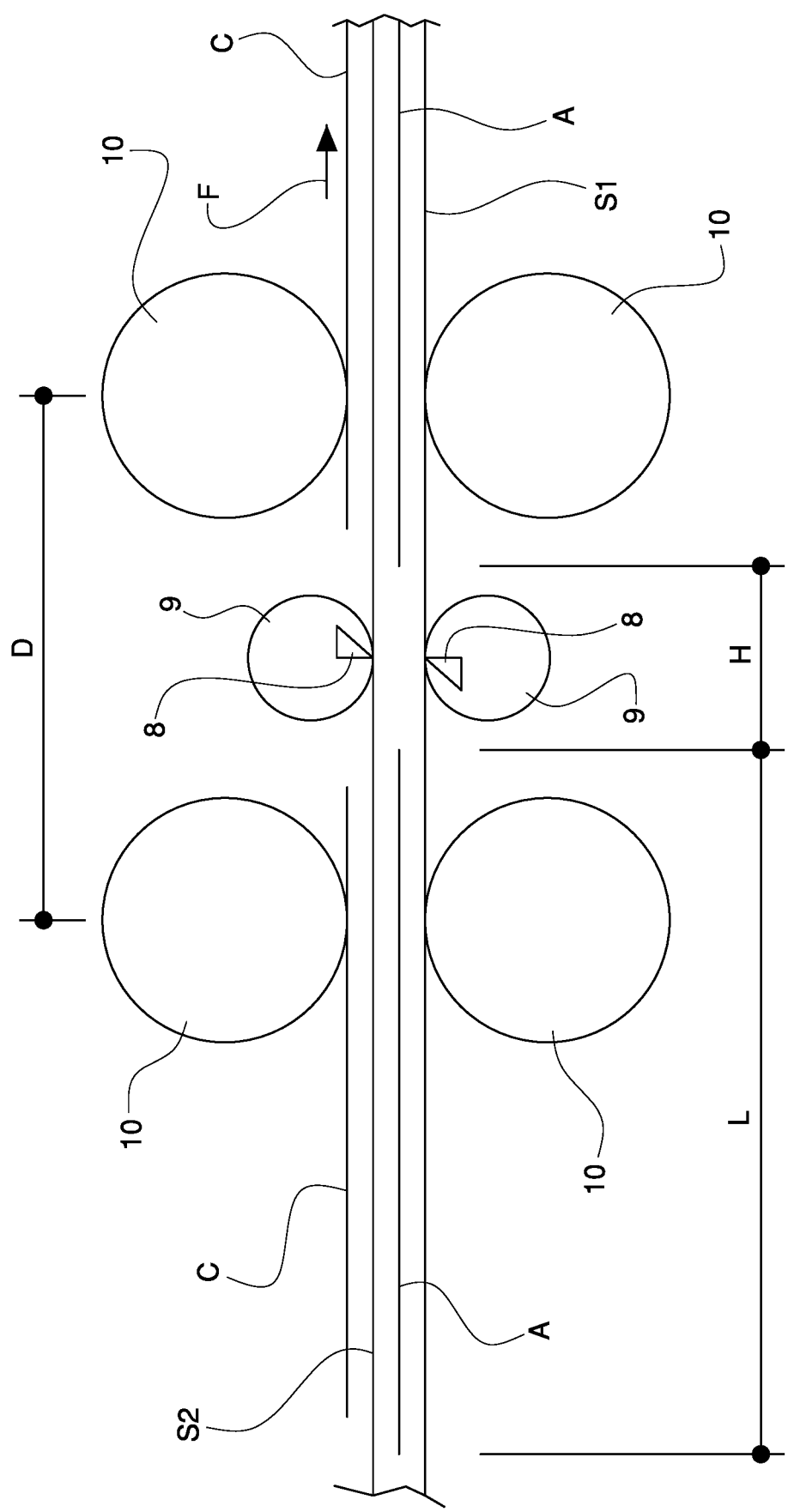
FIG. 3 schematically shows an enlarged detail of FIG. 2.

The two pairs of driving rollers 10 may be arranged, as in these examples, at a mutual distance D (distance D considered in the feed direction F) which is greater than a mutual distance H to which two adjacent electrodes (in particular two anodes A) are arranged on the separator. It is thus possible to perform the cutting of the separator(s), in an area which is electrode-free and which is comprised between two adjacent electrodes, over a period of time in which the two pairs of driving rollers engage the two adjacent electrodes (see FIG. 3).

The electrodes have a greater rigidity than the separators, so that the presence of the electrodes increases the rigidity of the assembly and gives a certain consistency and stability to the assembly itself. It has been seen that the driving rollers are capable of exerting a relatively effective driving force (in particular a pulling force which may also include a thrusting action) on the assembly when the driving rollers engage at least one electrode.

The assembly apparatus 1 may be configured such that the cutting device 7 performs the cutting of the separator(s) in a portion P (without electrodes) comprised between two adjacent electrodes in the same period of time in which the electrode immediately upstream of the cutting device 7 is engaged by the pair of driving rollers 10 upstream and the electrode immediately downstream of the cutting device 7 is engaged by the pair of downstream driving rollers 10, so that the force of cutting is exercised when the assembly is in a particularly stable configuration.

The assembly apparatus 1 may be configured in such a way that, during the continuous advancement of the assembly, when one of the two pairs of driving rollers 10 engages an assembly section without electrodes, the other pair of driving rollers 10 involves a portion of assembly where at least one electrode is present, so as to avoid that there is a moment in which both pairs of driving rollers 10 are coupled to assembly portions without electrodes and therefore particularly fragile and delicate and not very rigid, in order to ensure a certain continuity and regularity in the advancement motion of the assembly, reducing the risk of tearing or other damage to the assembly itself.

The two pairs of driving rollers 10 may be arranged, in particular, at a mutual distance D, considered in the feed direction, which is less than a length L of an electrode (length L considered in the feed direction). It is thus possible to ensure that at any time of operation of the assembly apparatus at least one of the two pairs of driving rollers 10 (the pair upstream or the pair downstream of the cutting device) always engages at least one electrode.

The forming device which forms discrete electrodes from a continuous element may be configured, as in this example, so that the formed electrodes have a length L which is greater than the mutual distance D between the two pairs of driving rollers 10.

Figure 4:
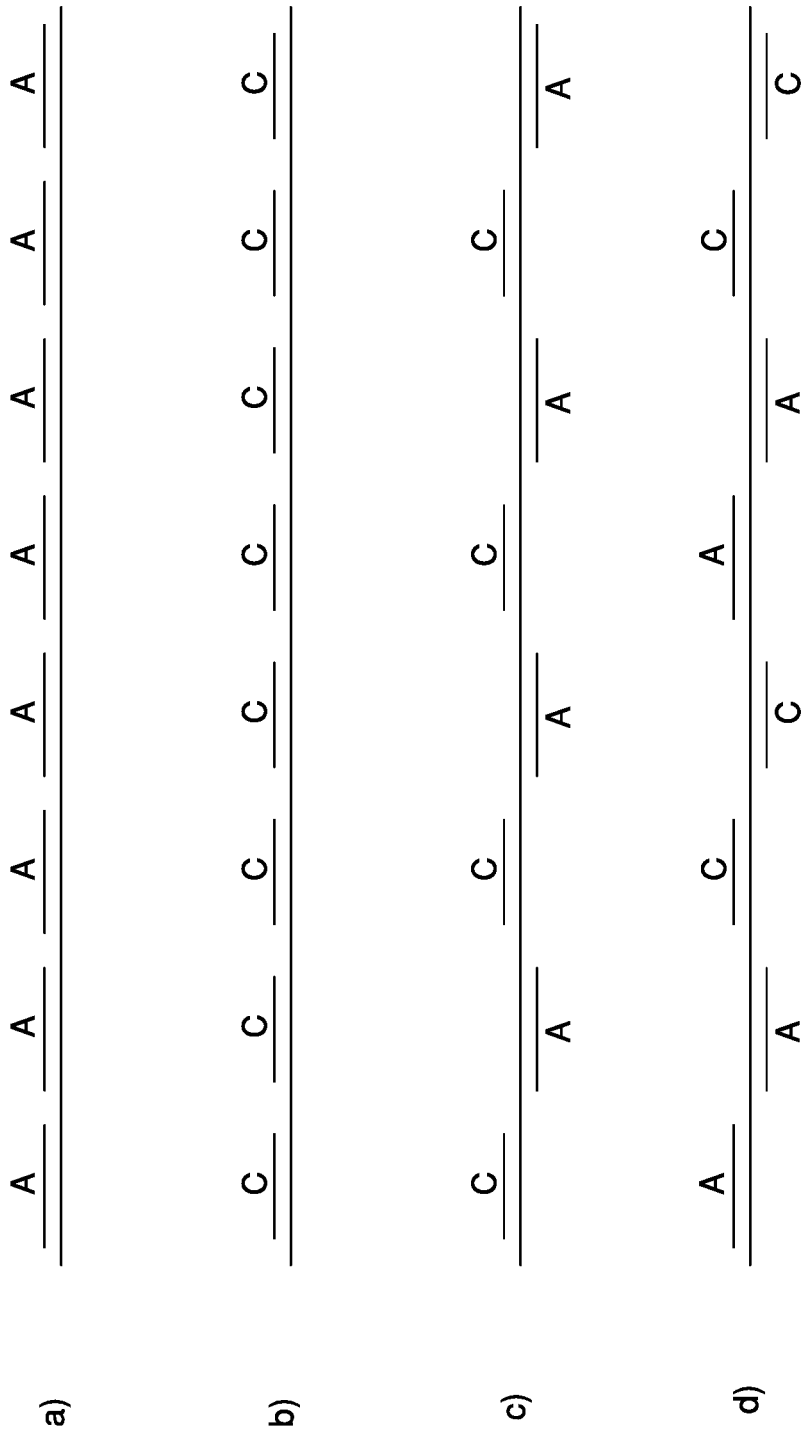
FIG. 4 shows some examples of assemblies that can be obtained with an assembly apparatus or method according to the present invention.

In the example of FIG. 1, a single separator is provided with a series of electrodes arranged on the same (upper) side of the separator. FIG. 4 shows four different assemblies which can be made with an assembly apparatus according to the present invention using a single separator S. In particular: FIG. 4*a*) shows an assembly comprising a single separator sheet S and a series of anodes A arranged on a same side of the separator; FIG. 4*b*) shows an assembly comprising a single separator sheet S and a series of anodes C arranged on the same side of the separator; FIG. 4*c*) shows an assembly comprising a single separator sheet S and a series of cathodes C arranged on one side of the separator and interspaced with a series of anodes A arranged on the opposite side of the separator; FIG. 4*d*) shows an assembly comprising a single separator sheet S, a series of anodes A alternating with cathodes C arranged on one side of the separator and interspaced with a series of cathodes C alternating with anodes A arranged on the opposite side of the separator. It is possible to provide other combinations and arrangements of anodes A and/or cathodes C on a single separator.

In the example of FIG. 6 an assembly apparatus 1 is shown suitable for the assembly of two separators S1 and S2 with a series of electrodes (anodes A and cathodes C), in which some electrodes (for example all anodes A) are arranged between the two separators S1 and S2, other electrodes (for example half of the cathodes C) are arranged on an outer side of the first separator S1, still other electrodes (for example the other half of the cathodes C) are arranged on an outer side of the second separator S2. The discrete electrodes (anodes A and cathodes C) may be formed from electrodes E in the form of continuous sheets (e.g., rolled by coils) by cutting devices 6 (for example of a known type).

Figure 5:
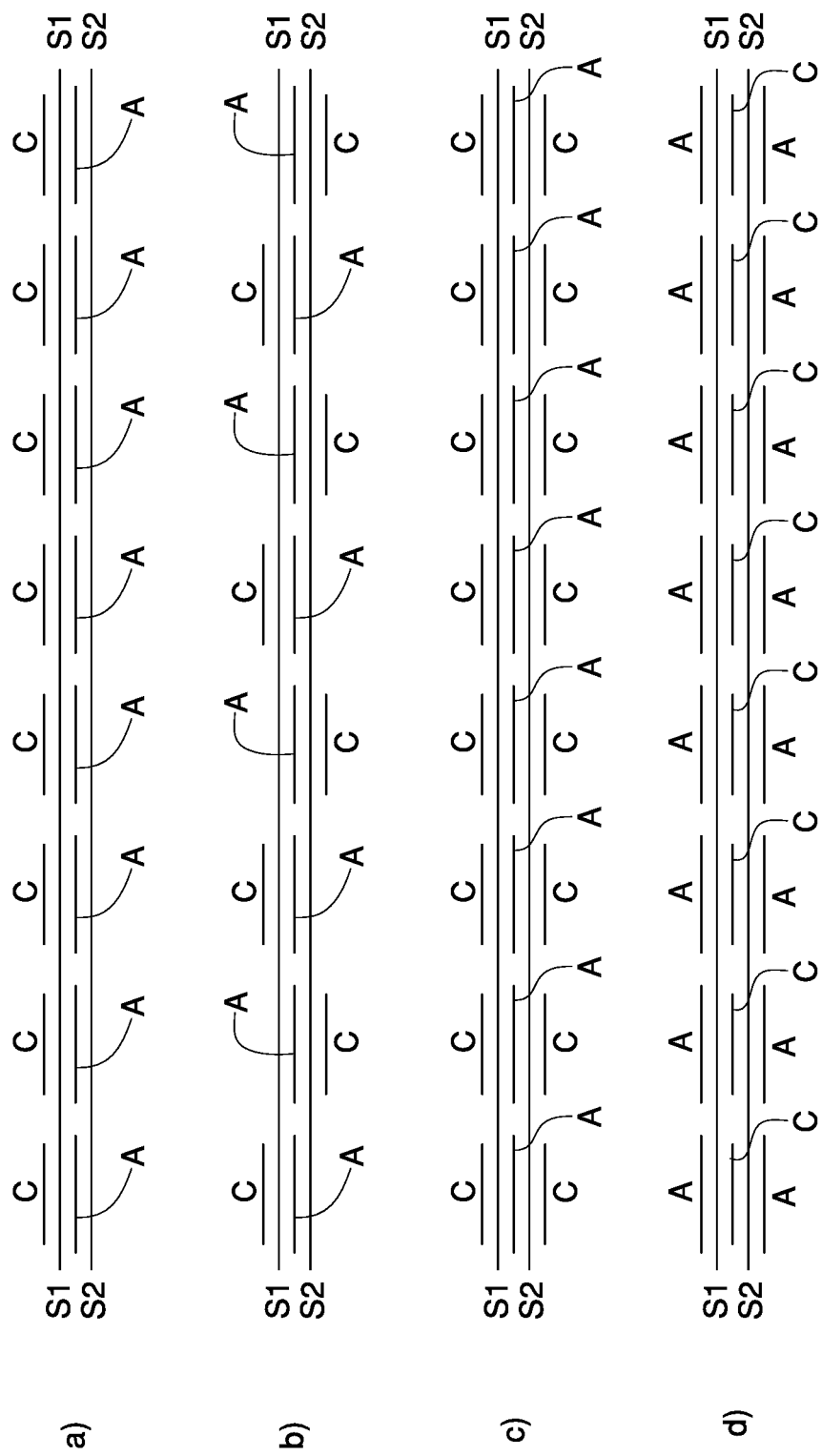
FIG. 5 shows other examples of assemblies obtainable with an assembly apparatus or method according to the present invention.

FIG. 5 shows four different assemblies which may be made with an assembly apparatus according to the present invention by using two separators S1 and S2. In particular: FIG. 5*a*) shows an assembly comprising the anodes A arranged between the two separators and the cathodes C arranged on one side of a separator S1; FIG. 5*b*) shows an assembly comprising the anodes A arranged between the two separators S1 and S2 and the cathodes C arranged on the outer sides of the two separators S1 and S2, alternating so that only one cathode C is superimposed on each anode A; FIG. 5*c*) shows an assembly comprising the anodes A arranged between the two separators S1 and S2 and the cathodes arranged on the outer sides of the two separators S1 and S2 so that at each anode A two cathodes C are superimposed; FIG. 5*d*) shows an assembly comprising the cathodes C arranged between the two separators S1 and S2 and the anodes A arranged on the outer sides of the two separators S1 and S2 so that each cathode C is superimposed with two anodes A. It is possible to provide other combinations and arrangements of anodes A and/or cathodes C on two separators S1 and S2.

The assembly apparatus 1 may comprise, in particular, laminating means 11 (for example of the roller type) for performing lamination of the separator(s) with the electrodes. The laminating means 11 may be arranged before the cutting device 7 of the separator (as in the example of FIG. 6) or after the cutting device 7. It is also possible to provide apparatuses and assembly methods made in accordance with the invention and without the laminating means.

The operation of the assembly apparatus 1 is as follows.

It is possible to provide for feeding at least one continuous separator S, S1, S2 (for example unwound from the reel 3) in the feed direction F, with continuous or intermittent motion, along the feeding path. It is possible to provide at least one continuous electrode E (for example unwound from the coil 5) and to form discrete electrodes (anodes A and/or cathodes C) by successive cuts of the continuous electrode E. The electrodes thus formed may be arranged, in particular, one after the other at a mutual distance on at least one side of a separator along the feed path, so as to form an assembly comprising one, two or more continuous separators and an ordered arrangement of discrete electrodes.

This assembly may be fed, with continuous or intermittent motion, to the cutting device 7, which performs a succession of cuts of the separator S, S1, S2 in which each cut occurs along a cutting line transverse to the direction of feeding F. The cutting line of the separator is arranged in a portion P of separator without electrodes and included between two adjacent electrodes. The separator may be cut using the pair of counter-rotating blades 8.

The separator and the electrodes arranged on the separator may be driven in the feed direction F by the two pairs of driving rollers 10.

The assembly apparatus 1 may comprise (electronic and programmable) control means configured (in particular, provided with appropriate computer program instructions) so that the cutting of the separator S, S1, S2 along the cutting line placed between two adjacent electrodes occurs at a moment in which the two pairs of driving rollers 10 engage the two adjacent electrodes, i.e. the pair of driving rollers 10 downstream of the counter-rotating blades 8 engages the front electrode (downstream of the blades 8) and the pair of driving rollers 10 upstream of the counter-rotating blades 8 engages the rear electrode, which is immediately behind (upstream of the blades 8).

The (electronic) control means of the assembly apparatus 1 may be configured in such a way that the various electrodes arranged on at least one separator advance along the feeding path passing through the two pairs of driving rollers 10 having always, instant by instant, at least one of the two pairs of driving rollers 10 engaging at least one electrode.

The (electronic) control means of the assembly apparatus 1 may be configured in such a way that, when the separator is cut, each blade 8 of the pair of counter-rotating blades has, at the cutting edge, a tangential velocity substantially equal to a feed speed of the separator.

The electrodes (anodes A and cathodes C) are arranged according to a predetermined step (for example a step P equal to the length L of the electrode plus the distance H between two adjacent electrodes). In the specific example of FIG. 3 reference is made in particular to the length L of an anode A and to the distance H between two consecutive anodes A, since normally the anodes A are longer than the cathodes C.

The (electronic) control means of the assembly apparatus 1 may be configured so that each blade 8 of the pair of counter-rotating blades rotates with a controlled rotation speed so as to make a complete revolution at the same time as the assembly formed by separator(s) and electrodes advances a step P along the feed path.

The (electronic) control means of the assembly apparatus 1 may be configured to feed the product with a continuous motion (for example at a constant speed) and in such a way that each blade 8 of the pair of counter-rotating blades rotates with a variable rotation speed, so as to perform at each complete revolution at least one acceleration and at least one deceleration, in particular for the purpose of working with a relatively high feed rate of the product along the feeding path, so as to be able to perform a complete revolution while the product (i.e. the assembly of at least one separator with the various electrodes) advances a step P while having, at the time of cutting, a tangential cutting speed equal to the feeding speed of the product.

As has been seen, the mutual distance D between the two pairs of driving rollers is selected on the basis of at least one dimensional characteristic of the assembly of electrodes, in particular according to the length L and/or the distance H between two adjacent electrodes. The mutual distance D between the two pairs of driving rollers is greater than the mutual distance H between two electrodes so that it is possible to cut the separator when the two pairs of driving rollers engage the two adjacent electrodes, i.e. in product portions relatively stiffer and more resistant.

According to a non-limiting aspect 1 of the present invention, it is provided a method for assembling electrodes, comprising the steps of:

feeding at least one separator S; S1, S2 in a feeding direction F along a feeding path;

arranging electrodes A; C one after the other at a mutual distance H on at least one side of said separator along said feeding path;

cutting said separator S; S1, S2 along a cutting line that is transverse to said feeding direction F and is arranged in a separator portion P that is free of electrodes and is comprised between two adjacent electrodes, said cutting step being performed by means of at least one pair of counter-rotating blades 8.

According to a non-limiting aspect 2, the method of aspect 1 comprises a step of driving said separator S; S1, S2 and said electrodes A; C arranged on said separator, said driving step being performed by means of two pairs of driving rollers 10 arranged one upstream and the other downstream of said pair of counter-rotating blades 8.

According to a non-limiting aspect 3, in the method of aspect 2, said step of cutting said separator along a cutting line arranged in a separator portion P between two adjacent electrodes occurs at a time when said two pairs of driving rollers 10 engage said two adjacent electrodes.

According to a non-limiting aspect 4, in the method of aspects 2 or 3, said electrodes, which are arranged on at least one side of said separator, advance along said feeding path through said two pairs of driving rollers 10 so that at least one or the other among said two pairs of driving rollers always engage at least one electrode.

According to a non-limiting aspect 5, in the method of aspects 1-4, at the time of cutting said separator S; S1, S2, a cutting edge of each blade 8 of said pair of counter-rotating blades has a tangential speed that is equal to a feeding speed of said separator.

According to a non-limiting aspect 6, in the method of aspects 1-5, said electrodes are arranged with a predetermined step P and wherein each blade 8 of said pair of counter-rotating blades rotates in such a way that it performs a complete revolution at the same time that said separator S; S1, S2 and said electrodes A; C advance a step P along said feeding path.

According to a non-limiting aspect 7, in the method of aspects 1-6, said counter-rotating blades 8 have respective cutting edges that assume a cutting configuration in which they simultaneously interfere with said separator along said cutting line and they face one another at a mutual distance that is non null and that is considered in a normal direction to said feeding direction F.

According to a non-limiting aspect 8 of the present invention, it is provided an apparatus for assembling electrodes, in particular for implementing a method according to any one of the preceding claims, said apparatus comprising:

at least one separator feeder 2 configured to feed at least one separator S; S1, S2 in a feeding direction F along a feeding path;

at least one electrode feeder 4 configured to arrange electrodes A; C in succession one after the other at a mutual distance H on at least one side of the separator S; S1, S2 along said feeding path;

at least one pair of counter-rotating blades 8 arranged along said feeding path after said electrode feeder 4 to cut the separator S; S1, S2 along at least one cutting line that is transverse to said feeding direction F.

According to a non-limiting aspect 9, the apparatus of aspect 8 comprises at least two pairs of driving rollers 10 arranged one upstream of said pair of counter-rotating blades 8 and the other downstream of said pair of counter-rotating blades 8 to drive separator and electrodes along said feeding path.

According to a non-limiting aspect 10, in the apparatus of aspect 9, said at least two pairs of driving rollers 10 are arranged at a mutual distance D, considered in said feeding direction F, which is greater than a mutual distance H at which two adjacent electrodes A are arranged on the separator S; S1, S2 so that the separator can be cut in a separator portion P that is free of electrodes between two adjacent electrodes when said two pairs of driving rollers 10 engage the two adjacent electrodes.

According to a non-limiting aspect 11, in the apparatus of aspects 9 or 10, said two pairs of driving rollers 10 are arranged at a mutual distance D, considered in said feeding direction F, which is less than a length L of an electrode A, considered in said feeding direction F, so that at least one of said two pairs of driving rollers always engages at least one electrode.

According to a non-limiting aspect 12, in the apparatus of aspect 11, said electrode feeder 4 comprises at least one forming device configured to form discrete electrodes A; C from a continuous element E, said forming device being configured so that the formed electrodes have a length L that is greater than said mutual distance D) between said two pairs of driving rollers.

According to a non-limiting aspect 13 of the present invention, it is provided a method for assembling electrodes, comprising the steps of:
- feeding at least one separator S; S1, S2 in a feeding direction F along a feeding path;
- arranging electrodes A; C one after the other at a mutual distance H on at least one side of said separator along said feeding path;
- cutting said separator S; S1, S2 along a cutting line that is transverse to said feeding direction F and is arranged in a separator portion P that is free of electrodes and is comprised between two adjacent electrodes, said cutting step being performed by means of at least one cutting device 7;
- driving said separator S; S1, S2 and said electrodes A; C arranged on said separator;

wherein
- said driving step is performed by means of two pairs of driving rollers 10 arranged one upstream and the other downstream of said cutting device 7;
- said step of cutting said separator along a cutting line arranged in a separator portion P between two adjacent electrodes occurs at a time when said two pairs of driving rollers 10 engage said two adjacent electrodes.

According to a non-limiting aspect 14, in the method of aspect 13, said electrodes, which are arranged on at least one side of said separator, advance along said feeding path through said two pairs of driving rollers 10 so that at least one or the other among said two pairs of driving rollers always engage at least one electrode.

According to a non-limiting aspect 15, in the method of aspects 13 or 14, said cutting device 7 comprises at least one pair of counter-rotating blades 8.

According to a non-limiting aspect 16, in the method of aspect 15, at the time of cutting said separator S; S1, S2, a cutting edge of each blade 8 of said pair of counter-rotating blades has a tangential speed that is equal to a feeding speed of said separator.

According to a non-limiting aspect 17, in the method of aspects 15 and 16, said electrodes are arranged with a predetermined step P and wherein each blade 8 of said pair of counter-rotating blades rotates in such a way that it performs a complete revolution at the same time that said separator S; S1, S2 and said electrodes A; C advance a step P along said feeding path.

According to a non-limiting aspect 18, in the method of aspects 15-17, said counter-rotating blades 8 have respective cutting edges that assume a cutting configuration in which they simultaneously interfere with said separator along said cutting line and they face one another at a mutual distance that is non null and that is considered in a normal direction to said feeding direction F.

According to a non-limiting aspect 19 of the present invention, it is provided an apparatus for assembling electrodes s, in particular for implementing a method according to any one of the preceding claims, said apparatus comprising:
- at least one separator feeder 2 configured to feed at least one separator S; S1, S2 in a feeding direction F along a feeding path;
- at least one electrode feeder 4 configured to arrange electrodes A; C in succession one after the other at a mutual distance H on at least one side of the separator S; S1, S2 along said feeding path;
- at least one cutting device 7 arranged along said feeding path after said electrode feeder 4 to cut the separator S; S1, S2 along at least one cutting line that is transverse to said feeding direction F;
- at least two pairs of driving rollers 10 arranged one upstream of said cutting device 7 and the other downstream of said one cutting device 7 to drive separator and electrodes along said feeding path, wherein said at least two pairs of driving rollers 10 are arranged at a mutual distance D, considered in said feeding direction F, which is greater than a mutual distance H at which two adjacent electrodes A are arranged on the separator S; S1, S2 so that the separator can be cut in a separator portion P that is free of electrodes between two adjacent electrodes when said two pairs of driving rollers 10 engage the two adjacent electrodes.

According to a non-limiting aspect 20, in the apparatus of aspect 19, said two pairs of driving rollers 10 are arranged at a mutual distance D, considered in said feeding direction F, which is less than a length L of an electrode A, considered in said feeding direction F, so that at least one of said two pairs of driving rollers always engages at least one electrode.

According to a non-limiting aspect 21, in the apparatus of aspect 19 or 20, said electrode feeder 4 comprises at least one forming device configured to form discrete electrodes A; C from a continuous element E, said forming device being configured so that the formed electrodes have a length L that is greater than said mutual distance D between said two pairs of driving rollers.

According to a non-limiting aspect 22, in the apparatus of aspects 19 to 21, said cutting device 7 comprises at last one pair of counter-rotating blades 8.

The invention claimed is:

1. Method for assembling electrodes, comprising the steps of:
- feeding at least one separator (S; S1, S2) in a feeding direction (F) along a feeding path;
- arranging electrodes (A; C) one after the other at a mutual distance (H) on at least one side of said separator along said feeding path;
- cutting said separator (S; S1, S2) along a cutting line that is transverse to said feeding direction (F) and is arranged in a separator portion (P) that is free of electrodes and is comprised between two adjacent electrodes, said cutting step being performed by means of at least one cutting device (7);
- driving said separator (S; S1, S2) and said electrodes (A; C) arranged on said separator;

characterized in that:
- said driving step is performed by means of two pairs of driving rollers (10) arranged one upstream and the other downstream of said cutting device (7) such that said cutting device (7) is spaced apart from and is at a different location than each pair of said two pairs of driving rollers;
- said step of cutting said separator along a cutting line arranged in a separator portion (P) between two adjacent electrodes occurs at a time when said two pairs of driving rollers (10) engage said two adjacent electrodes.

2. Method according to claim 1, wherein said electrodes, which are arranged on at least one side of said separator, advance along said feeding path through said two pairs of driving rollers (10) so that at least one or the other among said two pairs of driving rollers always engage at least one electrode.

3. Method according to claim 1, wherein said cutting device (7) comprises at least one pair of counter-rotating blades (8) that are carried by a pair of rollers (9) that are different than the two pairs of driving rollers (10) and are spaced apart from each pair of the two pairs of driving rollers (10).

4. Method according to claim 3, wherein, at the time of cutting said separator (S; S1, S2), a cutting edge of each blade (8) of said pair of counter-rotating blades has a tangential speed that is equal to a feeding speed of said separator.

5. Method according to claim 3, wherein said electrodes are arranged with a predetermined step (P) and wherein each blade (8) of said pair of counter-rotating blades rotates in such a way that it performs a complete revolution at the same time that said separator (S; S1, S2) and said electrodes (A; C) advance a step (P) along said feeding path.

6. Method according to claim 3, wherein said counter-rotating blades (8) have respective cutting edges that assume a cutting configuration in which said counter-rotating blades (8) simultaneously interfere with said separator along said cutting line and face one another at a mutual distance that is non null so as to not penetrate an entire thickness of said separator and that is considered in a normal direction to said feeding direction (F).

7. Apparatus for assembling electrodes, in particular for implementing a method according to claim 1, said apparatus comprising:
   at least one separator feeder (2) configured to feed at least one separator (S; S1, S2) in a feeding direction (F) along a feeding path;
   at least one electrode feeder (4) configured to arrange electrodes (A; C) in succession one after the other at a mutual distance (H) on at least one side of the separator (S; S1, S2) along said feeding path;
   at least one cutting device (7) arranged along said feeding path after said electrode feeder (4) to cut the separator (S; S1, S2) along at least one cutting line that is transverse to said feeding direction (F);
   at least two pairs of driving rollers (10) arranged one immediately upstream of said cutting device (7) and the other immediately downstream of said one cutting device (7) to drive separator and electrodes along said feeding path;
   wherein said cutting device (7) is spaced apart from and is at a different location than each pair of said two pairs of driving rollers (10).

8. Apparatus according to claim 7, wherein said cutting device (7) comprises at last one pair of counter-rotating blades (8) that have respective cutting edges that assume a cutting configuration in which the at least one pair of counter-rotating blades (8) simultaneously interfere with said separator along said cutting line and the at least one pair of counter-rotating blades (8) face one another at a mutual distance that is non null so as to not penetrate an entire thickness of said separator and that is considered in a normal direction to said feeding direction (F).

9. Method for assembling electrodes, comprising the steps of:
   feeding at least one separator (S; S1, S2) in a feeding direction (F) along a feeding path;
   arranging electrodes (A; C) one after the other at a mutual distance (H) on at least one side of said separator along said feeding path;
   cutting said separator (S; S1, S2) along a cutting line that is transverse to said feeding direction (F) and is arranged in a separator portion (P) that is free of electrodes and is comprised between two adjacent electrodes, said cutting step being performed by means of at least one pair of counter-rotating blades (8); a step of driving said separator (S; S1; S1) and said electrodes (A;C) arranged on said separator, said driving step being performed by means of two pairs of driving rollers (10) arranged one immediately upstream and the other immediately downstream of said pair of counter-rotating blades (8); wherein a step of cutting said separator along a cutting line arranged in a separator portion (P) between two adjacent electrodes occurs at a time when said two pairs of driving rollers (10) engage said two adjacent electrodes.

10. Method according to claim 9, wherein said electrodes, which are arranged on at least one side of said separator, advance along said feeding path through said two pairs of driving rollers (10) so that at least one or the other among said two pairs of driving rollers always engage at least one electrode.

11. Method according to claim 9, wherein, at the time of cutting said separator (S; S1, S2), a cutting edge of each blade (8) of said pair of counter-rotating blades has a tangential speed that is equal to a feeding speed of said separator.

12. Method according to claim 9, wherein said electrodes are arranged with a predetermined step (P) and wherein each blade (8) of said pair of counter-rotating blades rotates in such a way that it performs a complete revolution at the same time that said separator (S; S1, S2) and said electrodes (A; C) advance a step (P) along said feeding path.

13. Method according to claim 9, wherein said counter-rotating blades (8) have respective cutting edges that assume a cutting configuration in which they simultaneously interfere with said separator along said cutting line and they face one another at a mutual distance that is non null so as to not penetrate an entire thickness of said separator and that is considered in a normal direction to said feeding direction (F).

14. Apparatus for assembling electrodes, in particular for implementing a method according to claim 9, said apparatus comprising:
   at least one separator feeder (2) configured to feed at least one separator (S; S1, S2) in a feeding direction (F) along a feeding path;
   at least one electrode feeder (4) configured to arrange electrodes (A; C) in succession one after the other at a mutual distance (H) on at least one side of the separator (S; S1, S2) along said feeding path;
   at least one pair of counter-rotating blades (8) arranged along said feeding path after said electrode feeder (4) to cut the separator (S; S1, S2) along at least one cutting line that is transverse to said feeding direction (F), wherein one pair of driving rollers (10) is arranged immediately upstream of the at least one pair of counter rotating blades (8) and another pair of driving rollers (10) is arranged immediately downstream of the at least one pair of counter rotating blades (8).

15. Apparatus according to claim 14, wherein said pair of counter-rotating blades (8) are supported by a pair of rollers (9) at a location between and spaced from the one pair and the other pair of driving rollers (10) to drive separator and electrodes along said feeding path.

* * * * *